Oct. 4, 1955  J. W. RICHARDS ET AL  2,719,749
MOTOR VEHICLE WINDSHIELD PILLAR CONSTRUCTION
Filed March 19, 1954  2 Sheets-Sheet 1

J. W. RICHARDS
A. V. PULLEYBLANK
INVENTORS

BY E. C. McRae
J. R. Faulkner
T. H. Oster

ATTORNEYS

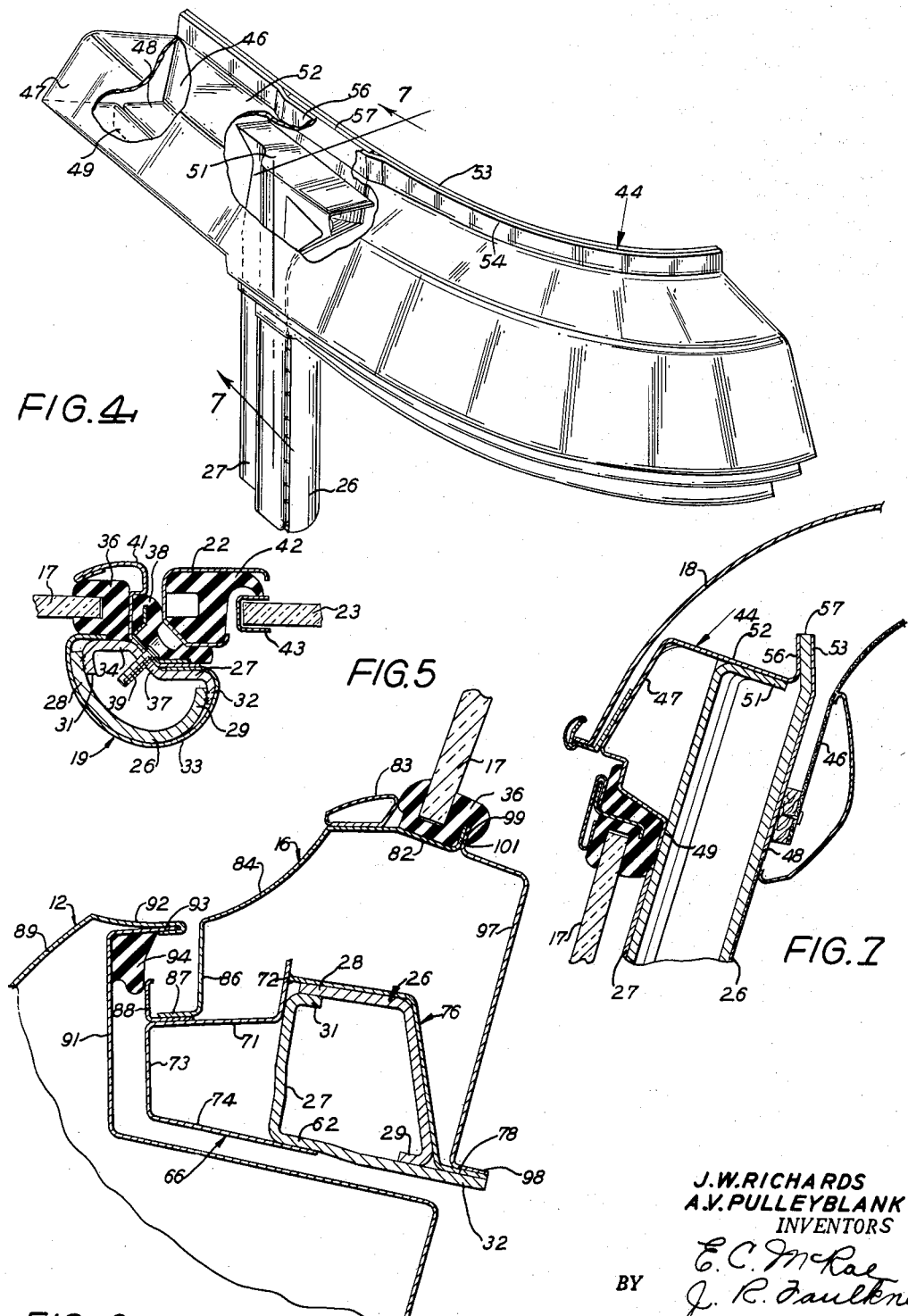

United States Patent Office 2,719,749
Patented Oct. 4, 1955

2,719,749

MOTOR VEHICLE WINDSHIELD PILLAR CONSTRUCTION

Jesse W. Richards, Dearborn, and Aubrey V. Pulleyblank, Detroit, Mich., assignors to Ford Motor Company, Dearborn, Mich., a corporation of Delaware Application March 19, 1954, Serial No. 417,256

4 Claims. (Cl. 296—28)

This invention relates generally to motor vehicles, and has particular reference to an improved body construction for motor vehicles.

An object of the present invention is to provide a windshield pillar construction for a motor vehicle possessing the requisite structural strength and rigidity while at the same time having a relatively small cross sectional area to minimize the obstruction to the driver's field of vision. In addition the pillar presents a pleasing appearance both when viewed from the interior and the exterior of the car and provides the proper mounting for the windshield, window frame, and weather stripping.

Another object of the invention is to provide a body construction in which relatively sharp corners are provided at the upper and lower corners of the windshield adjacent the windshield pillar without allowing undue stress concentrations to occur in these areas. This is accomplished at the upper corner of the windshield by projecting the pillar directly into the roof rail and providing welded connections between the windshield pillar and the inner and outer roof rail sections both at the upper and at the lower portions of the roof rail. At the lower corner of the windshield the pillar is curved downwardly and forwardly and welded to an offset body hinge pillar to accommodate a vehicle door having its lower portion beneath the belt line offset forwardly from the rearward edge of the windshield. Undesirable stress concentrations are thus avoided with the desired relatively sharp corner at the lower corner of the windshield being obtained by means of an upper cowl panel which is not considered as a structural member.

Other objects and advantages of this invention will be made more apparent as this description proceeds, particularly when considered in connection with the accompanying drawings, wherein:

Figure 4 is a fragmentary perspective view of the connection between the windshield pillar and the roof rail.

Figure 5 is an enlarged horizontal cross sectional view taken through the right hand windshield pillar of the vehicle substantially on the plane indicated by the lines 5—5 of Figures 1 and 2.

Figure 6 is an enlarged vertical cross sectional view through the right hand side of the vehicle taken substantially on the plane indicated by the lines 6—6 of Figures 1 and 3.

Figure 7 is a vertical cross sectional view taken substantially on the plane indicated by the line 7—7 of Figure 4.

Figure 1:
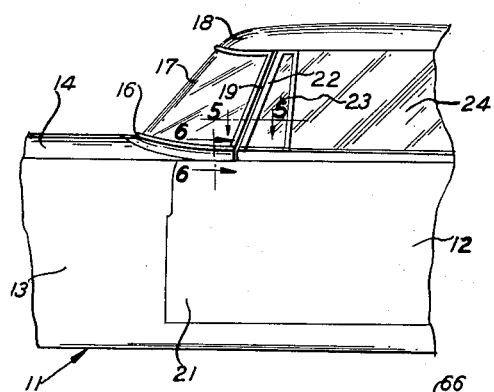
Figure 1 is a side elevational view of a portion of a motor vehicle incorporating the present invention.

Referring now to the drawings, and particularly to Figure 1, there is shown a motor vehicle body 11 having a front door 12, a front side panel 13, a hood 14, and an upper cowl panel 16. A curved windshield 17 is supported between the upper cowl panel 16 and the roof panel 18, and also between windshield pillars 19 at opposite sides of the vehicle. The front door 12 has a forward portion 21 offset forwardly from the windshield pillar 19 and connected by hinges (not shown) at its forward edge to the adjacent body structure. The door 12 supports a fixed frame 22 for a ventilating window 23, and is also provided with a vertically slidable window 24.

Referring now to Figure 5, it will be seen that the windshield pillar 19 is formed of an inner section 26 and an outer section 27. The inner section 26 is generally arcuate in cross section and its edge portions 28 and 29 overlap the marginal flanges 31 and 32 respectively of the outer pillar section 27, being arc welded thereto at spaced intervals. Intermediate the welds the joints between the inner and outer pillar sections are soldered and suitably metal finished to provide a smooth exterior surface. In the present instance the pillar is trimmed on the interior of the vehicle by means of a leather covering 33 secured by a suitable adhesive to the arcuate inner pillar section 26 and to the adjacent end portions of the outer pillar section 27.

The outer pillar section 27 is formed with a forward flange 34 receiving the windshield weather strip 36. The intermediate inclined portion 37 of the outer windshield pillar section 27 receives a door weather strip 38, the latter being secured to the pillar by fastening elements 39. The door weather strip 38 and the fastening elements 39 also serve to secure a decorative trim molding 41 to the pillar. The molding 41 provides a chrome trim for the exterior portion of the windshield weather strip 36.

The door weather strip 38 is generally U-shaped in cross section to provide weather sealing contact with the upper door frame 22 along two sides of the frame to provide an effective seal against the entrance of water, air and dirt. The upper door frame 22 conventionally contains a weather strip 42 engageable with the frame 43 of the pivoted ventilating window 23.

With reference now to Figures 4 and 7, it will be noted that the roof rail 44 is of box section and is formed of inner and outer roof rail sections 46 and 47 welded together. Immediately above the windshield pillar 19, the lower flanges 48 and 49 of the inner and outer roof rail sections are flared apart to form an opening corresponding in shape to the cross sectional shape of the windshield pillar 19. The inner and outer pillar sections 26 and 27 extend through this opening and are welded to the lower flanges 48 and 49 of the roof rail sections.

The windshield pillar sections project upwardly into the roof rail, and the outer pillar section 27 is formed with a marginal flange 51 at its upper end welded to the horizontal upper flange 52 of the outer roof rail section. The inner and outer roof rail sections 46 and 47 respectively are formed with upper marginal flanges 53 and 54 suitably welded together. Vertically above the windshield pillar 19, the marginal flange 54 of the outer roof rail section is formed with an offset portion 56 to provide space between the flanges 53 and 54 for the upper marginal portion 57 of the inner windshield pillar section 26. The portion 57 of the inner pillar section is suitably flattened to be received between the upper flanges 53 and 54 of the inner and outer roof rail sections, and is joined thereto by welding.

It will be seen that the windshield pillar is thus secured to both the inner and outer roof rail sections both along the lower portion of the roof rail and also adjacent the upper portion thereof. This provides a rigid construction and also permits a sharp corner to be maintained at the upper corner of the windshield adjacent the junction between the pillar 19 and the roof rail 44 without providing undue stress concentrations at this point.

Figure 2:
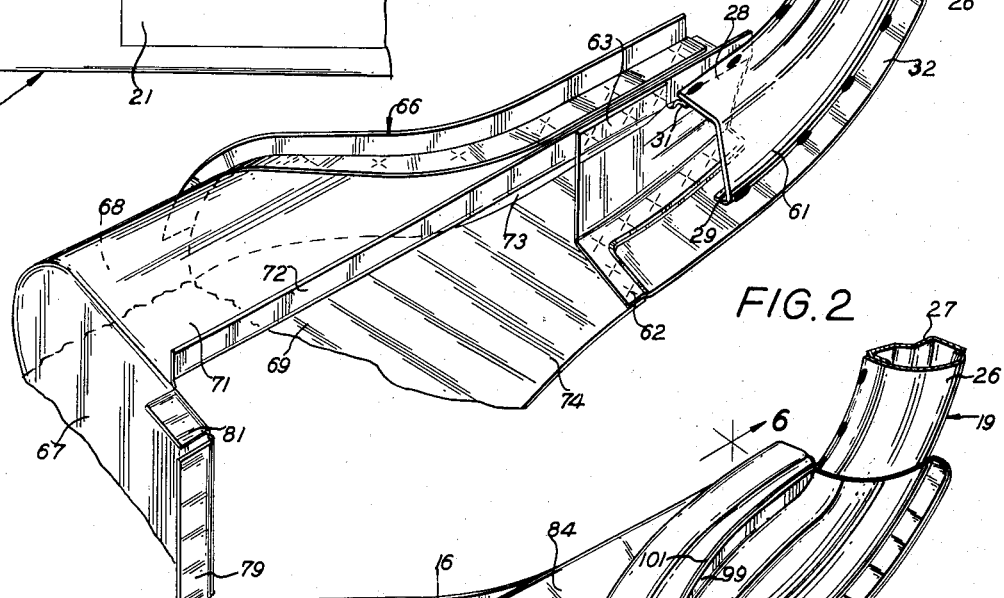
Figure 2 is a fragmentary perspective view of the structural subassembly of the body hinge pillar and the windshield pillar.
Figure 3:
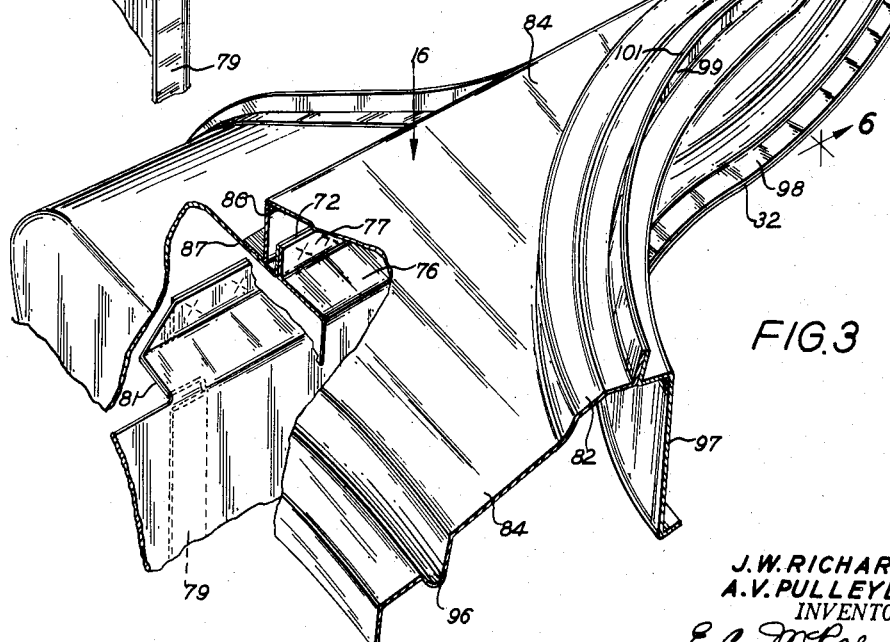
Figure 3 is a fragmentary perspective view of the construction shown in Figure 2, but with other sheet metal members attached thereto.

Reference is now made to Figures 2, 3, and 6 for an explanation of the manner in which the lower portion of the windshield pillar 19 is supported upon the vehicle body. The lower end portion 61 of the inner windshield pillar section 26 is curved forwardly on a rather broad arc to prevent undue stress concentration, and is gradually changed from an arcuate shape section in the region of the windshield to an L-shaped section at the lower end thereof. The lower end of the outer windshield pillar section 27 is also curved forwardly to conform to the curvature of the inner pillar section. The curved extensions of the pillar sections are welded together, the marginal flanges 28 and 29 of the inner pillar section 26 being arc welded to the marginal flanges 31 and 32 respectively of the outer pillar section 27.

Adjacent its lower end, the outer pillar section 27 is also L-shaped in cross section and in addition, the marginal flange 32 of the outer pillar section is widened adjacent the lower portion of the pillar to extend inwardly beyond the adjacent side wall of the inner pillar section 26. The outer pillar section also extends forwardly beyond the forward end 61 of the inner pillar sections to form horizontal and vertical mounting flanges 62 and 63 respectively.

The reference character 66 indicates generally the body hinge pillar which forms a structural part of the body structure and provides a support for the lower end of the windshield pillar 19. At its forward end the body hinge pillar 66 is channel shaped in horizontal cross section for strength, having a forward vertical wall 67, an outer vertical wall 68, and a rearward vertical wall 69 with the latter forming the forward boundary of the vehicle door opening. Hinges (not shown) are mounted upon the wall 69 and pivotally support the vehicle door 12 for opening movement about a vertical axis adjacent the forward edge of the door. The upper end of the channel-shaped forward portion of the body hinge pillar 66 is closed by a generally horizontal upper wall 71, bent upwardly adjacent its inner marginal edge to form a vertical flange 72. The rearward portion of the vertical flange 72 of the body hinge pillar is positioned adjacent the vertical extension 63 of the outer windshield pillar section 27 and is welded thereto. The wall portion 69 of the body hinge pillar 66 is swept rearwardly and cooperates adjacent its rearward portion with the upper wall 71 to form an inwardly facing channel-shaped section having an outer wall 73 and a lower wall 74. The lower wal 74 is welded to the horizontal extension 62 of the outer windshield pillar section 27.

From the foregoing it will be seen that the windshield pillar 19 and the body hinge pillar 66 form a rigid unitary structure enabling loads to be transferred from the windshield pillar to the body hinge pillar and the associated body structure without causing undue stress concentrations.

Reference is now made particularly to Figures 3 and 6 which illustrate the addition of sheet metal panels to the structure described above. A side cowl panel 76, generally L-shaped in cross section, is welded at its rearward end portion to the correspondingly L-shaped lower end portions 61 of the inner windshield pillar section 26. The side cowl panel 76 is formed with an upper marginal flange 77 welded to the adjacent marginal flange 72 of the body hinge pillar 66. The side cowl panel 76 is also formed with a lower marginal flange 78 resting upon the widened portion of the marginal flange 32 of the outer windshield pillar section 27, being welded thereto. The forward end of the side cowl panel 76 is welded to the flanges 79 and 81 of the forward wall portion 67 of the body hinge pillar 66.

An upper cowl panel 16 is also provided, being formed with an upper wall 82 supporting the windshield weather strip 36 and the windshield trim molding 83, an exposed concave forward intermediate portion 84, and a generally vertical front wall 86. The lower portion of the front wall 86 of the upper cowl panel 16 is bent forwardly to form a marginal flange 87 which is welded to the upper wall 71 of the body hinge pillar 66. An L-shaped drain trough 88 is also welded to the body hinge pillar at this point, and cooperates with the front wall 86 of the upper cowl panel to provide a U-shaped gutter providing drainage for water entering between the upper cowl panel 16 and the front vehicle door 12 at the side of the car.

As seen in Figure 6, the front door 12 of the vehicle has an outer door panel 89 and an inner door panel 91 having marginal flanges 92 and 93 at their upper edges overlapping the drain trough. A weather strip 94 carried by the door engages the upper edge of the drain trough 88 to form a seal therebetween.

As best seen in Figure 3, the upper cowl panel 16 is curved in an inboard direction to correspond to the curvature of the windshield 17, and is formed adjacent its forward edge with an integral drain trough 96 to provide for the drainage of water entering between the upper cowl panel 16 and the vehicle hood 14.

A generally vertical windshield reinforcement panel 97 is formed with a lower marginal flange 98 welded to the extending portion of the marginal flange 32 of the outer pillar section 27. At its upper end the windshield reinforcement panel 97 is formed with a marginal flange 99 welded to the adjacent upper marginal flange 101 of the upper cowl panel 16, and the double thickness vertical flange thus formed is embraced by the windshield weather strip 36.

It will be noted that the windshield reinforcement panel 97 and the upper cowl panel 16 embrace the windshield pillar 19 adjacent the lower portion of the windshield and form a relatively sharp corner therewith. Stress concentrations are not introduced by reason of this sharp corner, however, since the upper cowl panel and windshield reinforcement panel are not primarily structural members, the loads being transmitted through the downwardly curved lower end portion of the windshield pillar 19 to the body hinge pillar 66, as previously described.

It will be understood that the invention is not to be limited to the exact construction shown and described, but that various changes and modifications may be made without departing from the spirit and scope of the invention, as defined in the appended claims.

What is claimed is:

1. In a motor vehicle body construction, a windshield pillar at each side of said body having inner and outer pillar sections welded together along their marginal edges, said windshield pillar having a generally vertically extending upper portion and a forwardly and downwardly curved lower portion, the forward ends of said inner and outer pillar sections being substantially horizontal, a door hinge pillar at each side of said body having a vertical door supporting portion and a generally horizontal rearwardly projecting portion with the latter being welded to the forward end of said outer windshield pillar section, a side cowl panel extending generally horizontally and longitudinally and having its forward end welded to said door hinge pillar and its rearward end welded to the inner windshield pillar section, said door hinge pillar and said side cowl panel forming a structural support for said windshield pillar, and an upper cowl panel extending transversely across said vehicle body and having its outer portions supported upon said door hinge pillars, said upper cowl panel having an upper flange generally arcuate in plan and conforming to the curvature of the windshield and extending transversely of the vehicle body between the windshield pillars at opposite sides thereof, said upper cowl flange intersecting said windshield pillars adjacent the juncture between the generally vertical upper portion of each windshield pillar and the forwardly and downwardly curved lower portion of each windshield pillar to form with the upper portions of said windshield pillars the windshield opening and to conceal from view the lower curved portions of said windshield pillars.

2. In a motor vehicle body construction, a windshield pillar having inner and outer pillar sections, said inner pillar section being generally arcuate in cross section and facing outwardly and said outer pillar section being generally U-shaped in cross section and facing inwardly, the adjacent marginal edges of said inner and outer pillar sections being welded together, said inner pillar section having an integral forwardly and downwardly curved extension terminating in an end portion generally L-shaped in cross section with an upper horizontal flange and an inner vertical flange, said outer pillar section having an integral forwardly and downwardly curved extension in alignment with the forwardly and downwardly curved extension of said inner pillar section and welded thereto and terminating in an end portion projecting forwardly beyond the forward end of said inner pillar section extension and having a lower horizontal flange and a vertical outer flange, a door hinge pillar having a horizontal rearwardly projecting and inwardly opening channel shaped extension overlapping the lower forward end of said windshield pillar, the lower horizontal wall of said door hinge pillar extension being positioned adjacent and welded to the lower horizontal flange of the outer windshield pillar section extension, the upper horizontal flange of said door hinge pillar extension having a generally vertically extending marginal flange welded to the vertical flange of said outer windshield pillar section forward extension, a generally L-shaped side cowl panel having its rearward end embracing and welded to the correspondingly L-shaped forward end of the lower extension of the inner windshield pillar section, said side cowl panel having an upper vertically projecting marginal flange welded to the adjacent vertical flange formed on the upper wall of the door hinge pillar extension, and an upper cowl panel extending transversely of said vehicle body and having its side portion formed with a marginal flange resting upon and welded to the upper wall of the door hinge pillar extension, said upper cowl panel having an upper flange extending transversely of the vehicle and forming the lower boundary of the windshield opening, the upper flange of said cowl panel intersecting said windshield pillar above the forwardly and downwardly curved extensions of said inner and outer windshield pillar sections to form a generally sharp corner of said windshield opening.

3. The structure defined by claim 2 which is further characterized in that a roof rail is provided adjacent the upper end of said windshield pillar, said roof rail having an inwardly facing generally U-shaped outer roof rail section, an inner roof rail section closing the open inner side of said outer roof rail section, said inner and outer roof rail sections having juxtaposed upper and lower vertically extending marginal flanges secured together, said windshield pillar projecting upwardly into said roof rail through an opening in the lower portion thereof, said outer windshield pillar section having an upper horizontal marginal flange welded to the upper wall of said outer roof rail section, and said inner windshield pillar section having a marginal end flange secured to the upper marginal flanges of said inner and outer roof rail sections.

4. In a vehicle body construction, a windshield pillar having an inner pillar section of arcuate generally semi-circular cross section facing outwardly, an outer pillar section closing the open outer side of said inner pillar section and having inwardly projecting marginal flanges secured to the adjacent marginal edges of said inner pillar section, said outer pillar section having a forward longitudinally extending portion, an inwardly inclined intermediate portion extending rearwardly from said forward portion and a longitudinally extending portion extending rearwardly from said intermediate portion and offset inwardly from said forward portion, a windshield weather strip seated upon the forward portion of said outer pillar section, a door weather strip secured to the inclined intermediate portion of said outer pillar section, a metal trim molding embracing the outboard side of said windshield weather strip and having a retaining flange extending between said door weather strip and the intermediate portion of said door pillar and secured thereto, and a flexible decorative trim cover for said arcuate inner pillar section having marginal edges wrapped around the marginal edges of said outer pillar section and engaging the forward and rearward longitudinal portions of said outer pillar section beneath said windshield and door weather strips.

References Cited in the file of this patent
UNITED STATES PATENTS
2,620,221     Romano  ---------------- Dec. 2, 1952